Oct. 28, 1924.
L. A. DENISON
1,513,590
METHOD OF AND APPARATUS FOR MAKING HOLLOW BRICK
Filed March 31, 1924
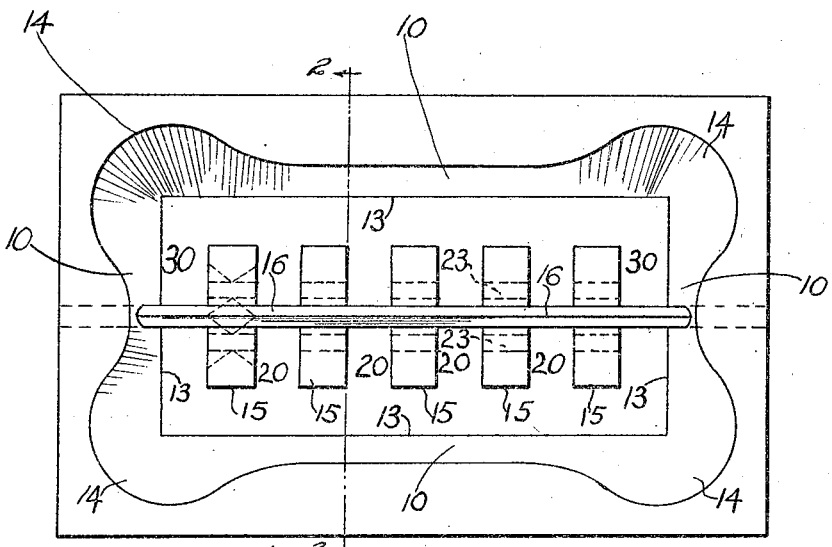
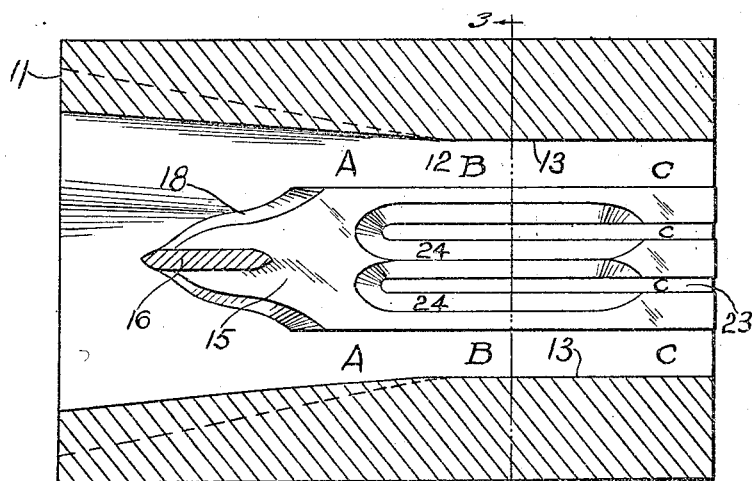
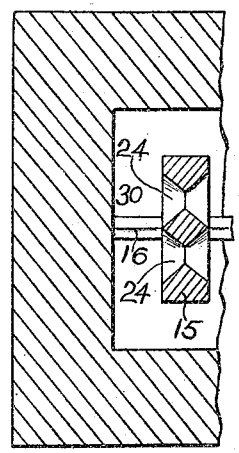
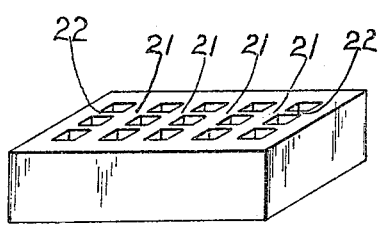
INVENTOR
Leonard A. Denison
By
Bates, Macklin, Goodrich & Teare
ATTORNEYS Patented Oct. 28, 1924.

1,513,590

UNITED STATES PATENT OFFICE.

LEONARD A. DENISON, OF CLEVELAND, OHIO.

METHOD OF AND APPARATUS FOR MAKING HOLLOW BRICK.

Application filed March 31, 1924. Serial No. 703,035.

*To all whom it may concern:*

Be it known that I, LEONARD A. DENISON, a citizen of the United States, residing at Cleveland, in the county of Cuyahoga and State of Ohio, have invented a certain new and useful Improvement in a Method of and Apparatus for Making Hollow Brick, of which the following is a full, clear, and exact description, reference being had to the accompanying drawings.

This invention is concerned with the formation of extruded plastic columns of material and has for its general object the provision of a balanced extruding core and die construction having the component parts thereof arranged in such manner as to insure the formation of an extruded column of equal or uniform density throughout the cross section thereof. More specifically my invention is concerned with the provision of an extruding core and die adaptable for the formation of plastic columns which may be subsequently severed into blocks comprising hollow building bricks.

A further object of my invention is the provision of a core structure having the clay directing channels thereof interrelated in such manner that a proportionate feed of the material under uniform pressure through all of the channels of the core and die may be obtained, thereby insuring the prevention of cracks and cleavages of the hollow brick thus formed due to the prevailing uniform density of the material in the brick.

A still further object is the provision of a novel method of guiding plastic material through the channels of a die and core to obtain a uniform density in a large number of webs formed in a hollow building brick.

Other objects of my invention will hereinafter become apparent from the following description referring to the accompanying drawings illustrating a preferred apparatus for carrying out my method. The essential characteristics are summarized in the claims.

In the drawings, Fig. 1 is an elevational view of a core and die which is effective in applying my method of forming hollow brick and as viewed from the throat end of the die; Fig. 2 is a cross-sectional elevation taken through the core and die substantially along the line 2—2 of Fig. 1; Fig. 3 is a fragmentary cross-sectional view taken transversely of the die and core substantially along the line 3—3 of Fig. 2; Fig. 4 is a perspective view of a hollow brick which may be formed by shearing into units, clay columns extruded through the die and core shown in Fig. 1.

In the past, considerable difficulty has been experienced in forming hollow brick due to the fact that the mortar bearing surfaces of the brick, particularly a brick of standard dimensions, comprises a transverse surface or cross-section of the extruded column, thereby necessitating the provision of a comparatively large number of intermediate webs as compared to an ordinary building tile and the formation of an extruded column presenting a large number of webs in cross-section has involved difficulties of warping and cracking of the material in the drying process. These difficulties are due either to lack of uniformity in the density of the extruded column or nonuniformity in the movement of the extruded mass when passing through the die and core channels thus defining cleavages in the extruded material which subsequently develop into cracks in the drying or burning processes.

My invention accordingly, contemplates the determination of a hollow brick cross-section which will present an adequate mortar bearing surface while having a sufficient percentage of void to promote a saving in the quantity of material being used as well as to provide insulating characteristics to the wall constructed of such brick.

The novel method by which I meet the production requirements in the manufacture of such brick, comprises preliminarily forming a hollow column which may be rectangular in cross-section with intermediate webs joining two of the walls of the column which walls when further progressed through the die and core are decreased in thickness without altering the density of the material therein. The surplus material is permitted to accumulate in cavities formed in the core intermediate the throat and extruding ends thereof and this excess material is caused to be formed into transverse webs which extend intermediate the first formed webs and between those webs and the walls of the column, this result being obtained by causing the excess material to flow through appropriate core channels with the same degree of movement as the material forming the outer walls of the brick.

A novel apparatus for carrying out the steps of the foregoing process comprises a core and die such as is illustrated in the drawings. The first step of the process is effected in the region A of the die throat, the second step in the region B and the final steps in the region C. The die as illustrated in Fig. 1 may have the throat thereof of a general rectangular shape with converging plane surfaces 10 extending from the receiving end 11 of the die to a position beyond the region A of the die throat and merging with the parallel surfaces 13 which form the outer faces of the column being extruded.

The throat of the die may be enlarged as shown at 14 at the approach to the corners or intersections of the surfaces 13 whereby a surplusage of material is directed thereto when first entering the throat, thus assuring a proper flow of material to the corners of the column being extruded.

The core may comprise a plurality of rectangular bars 15 supported upon a bridge 16 which may be suitably mounted in the die throat, the position of the bridge member 16 being such that the region A is unobstructed thereby. The throat ends of the core members may be tapered and provided with knife edges 18 to present a minimum resistance to the clay as it is being forced through the throat as well as to properly divide the material and direct it through core channels 20 which comprise the spaces between the core members 15. The width of these spaces corresponds to the width of the horizontally extending webs 21 formed in the finished product (see Fig. 4).

Transverse webs 22 of the brick are formed by providing parallel channels in the core members 15 and I locate these channels relative to the region A of the die throat whereby the webs 21 become formed before the transverse webs 22 are formed. As shown in Fig. 2 these channels may comprise slots 23 having parallel walls extending inwardly from the die mouth a substantial distance and extending into cavities 24 into which the material may be forced by reason of the contraction of the throat in the region A whereby the thickness of the outer walls of the column, as first defined by the throat and the core members 15 in the region A, is decreased. The shape of these cavities should be substantially as illustrated for experience has shown that by reason of the afforded contact between those portions of the moving column in the cavities 24 and in the side channels 30 comprising eventually the end walls of the column, that no shearing or cleavage takes place therebetween as the material in the cavities 24 is gradually reshaped and forced into the channels 23. It may be here noted that I first form the webs 21 and subsequently form the transverse webs 22 in the manner described as the column is continuously extruded through the die mouth.

The particular type of hollow brick illustrated has fifteen voids substantially square in cross-section and defined by the webs 21 and 22 and the bridge member 16 is accordingly provided with five core members 15, each adapted to form voids in the column being extruded.

From the foregoing description of the particular embodiment of my method and apparatus for forming hollow building brick, it will be apparent that the method may be adapted to a variety of core constructions wherein it is desired to effect the formation of parallel and transverse webs in a building brick or tile without necessitating the use of fillets in the corners of the voids to prevent cleavage or cracking of the product. By first defining the general shape of the outer wall of the column being extruded and also one set of parallel webs and then subsequently forming transverse webs by causing the material in the outer walls of the column, thus preliminarily defined, to be further contracted while providing secondary cavities to which the surplus material thus available may be forced, a balanced die and core may be obtained. With such an apparatus, I may form transverse webs considerably less in thickness than the first formed webs while insuring a uniform movement of the entire cross-section of material in the column being formed and the prevailing uniform density thus obtained in the column eliminates undue loss in the baking and burning period to which the severed column units in the form of brick are subsequently subjected.

I claim:

1. The method of forming hollow brick which includes the steps of first forming a hollow column having a webbed cross-section, with intermediate parallel webs extending between two opposite walls of the column, further extruding the column to decrease the thickness of the outer column walls, causing the excess material to form bulging masses on said webs and finally forming the bulging masses into transverse webs connecting the first formed webs to each other and to end walls of the column, said steps being effected as the column is continuously extruded.

2. A method of forming hollow building blocks which includes the steps of preliminarily forming the shell or outer walls of the block with intermediate webs extending between two opposite walls thereof, progressively decreasing the thickness of said shell walls while permitting an expansion of the webs to thereby maintain a uniform density throughout the cross-section of the moving column and finally forming the expanded portions of said webs into transverse webs extending intermediate the first formed webs.

3. The method of forming an extruded column of clay which is adapted to be subsequently divided into building blocks comprising forcing the clay through a die having a converging throat and a core, arranging the core relative to the die whereby a preliminary function of the core is performed in cooperation with the converging portion of the die throat to form the outer walls of the column and intermediate webs connecting two walls of the column, permitting said webs to become expanded by a surplusage of material available by decreasing the thickness of the outer walls of the column and forming intermediate transverse webs from said surplusage of material in the order named, as the material is continuously expressed through the core channels and die mouth.

4. The method of forming hollow building blocks which includes the steps of first forming a hollow column having a rectangular cross-section, with intermediate webs extending between two of the walls of the column, further extruding the column to decrease the thickness of the outer column walls, causing the excess material to increase the lateral dimensions of said webs and finally forming the excess material in said webs into transverse webs connecting the first formed webs to each other.

5. A method of forming hollow building blocks which includes the steps of preliminary forming a column shell with intermediate webs extending between two walls thereof, progressively decreasing the thickness of said shell walls while permitting an expansion of portions of the webs to thereby maintain a uniform density throughout the cross-section of the moving column and finally forming the expanded portions of said webs into transverse webs.

6. The combination of a die having a converging throat, a core comprising a bridge mounted in the throat of the die and column void forming members mounted on the bridge, said members having cavities formed therein intermediate the core bridge and the die mouth.

7. The combination of a die having a converging throat, and a core comprising a bridge mounted in the throat of the die and column void forming members mounted on the bridge, said members having cavities formed therein intermediate the core bridge and the die mouth and passageways associated with the cavities to serve as web forming channels.

8. In a device of the character described the combination of a die having a converging throat and a core having a bridge member mounted in the throat of the die and comprising a cluster of column void forming members mounted on the bridge, said members having expansion cavities formed intermediate the mouth of the die and the bridge of the core, the cavities being associated with core channels adapted to form transverse webs in the extruded column.

9. In a device of the character described the combination of a die having a converging throat, a core having a bridge member mounted in the throat of the die and comprising a cluster of column void forming members mounted on the bridge, said members having expansion cavities formed intermediate the mouth of the die and the bridge of the core, the cavities and parallel core channels extending from the cavities to the die mouth.

10. In an apparatus for forming hollow building blocks, the combination of a die, a core mounted therein comprising a supporting bridge mounted in the throat of the die and a plurality of column void forming members supported by the bridge, said core members being spaced apart on the bridge to provide channels for forming parallel ribs or webs in the column and cavities formed in said members to be disposed adjacent the channels.

11. In an apparatus for forming hollow building blocks, the combination of a die, a core mounted therein comprising a supporting bridge mounted in the throat of the die and a plurality of column void forming members supported by the bridge, said core members being apart on the bridge to provide channels for forming parallel ribs or webs in the column, said members being slotted to provide channels extending transversely to the first named channels.

12. In an apparatus for forming hollow building blocks, the combination of a die, a core mounted therein comprising a supporting bridge mounted in the throat of the die and a plurality of column void forming members supported by the bridge, said core members being spaced apart on the bridge to provide channels for forming parallel ribs or webs in the column, said members being slotted to provide channels extending transversely to the first named channels and expansion cavities formed in the members to be disposed intermediate the channels and the slots.

In testimony whereof, I hereunto affix my signature.

LEONARD A. DENISON.